United States Patent Office
2,887,409
Patented May 19, 1959

2,887,409
SUBSTITUTED GUANAMINE-FORMALDEHYDE REACTION PRODUCTS AND THE PROCESS FOR TREATING TEXTILES THEREWITH

William Julius van Loo, Jr., Middlesex, N.J.

No Drawing. Application June 14, 1956
Serial No. 591,299

21 Claims. (Cl. 117—139.4)

The present invention relates to resins for textile finishing and to the process for treating textiles therewith. More particularly, it relates to a process for treating textiles with certain polymethylol guanamines and their alkylated derivatives.

The textile industry in the past has employed many finishes of the resin type to impart wrinkle recovery and dimensional stability to textile fabrics and in particular to cellulosic textile materials including cotton and rayon, both viscose and cuprammonium. One of the first of these resins to be employed was the so-called urea-formaldehyde type. While possessing many good features, certain resins of this type had a serious deficiency in that loss of tensile strength following chlorine bleaching was extensive and therefore partially limited their utility. A second notable deficiency in certain resins of this type was that high concentrations of resin solids on the fabric were required to impart desirable properties. These higher concentrations further intensified the deficiencies promoted by chlorine absorption, e.g. loss of tensile strength.

Gradually, the urea-formaldehyde resins were, to a very large extent, supplanted on cellulosic textiles by the melamine-formaldehyde type resin which imparted superior wrinkle recovery to cellulosic materials at lower resin concentrations than the urea-formaldehyde type resin without significant loss of tensile strength following chlorine bleaching. Some melamine-formaldehyde type resins, however, have a tendency to discolor when exposed to chlorine bleaching, which restricts their use on white fabrics that are likely to be bleached with chlorine.

A third type of resin, namely the ethylene-urea-formaldehyde type, is also used today and resins of this type, to some extent, offer a compromise between the deficiencies of certain urea-formaldehyde type resins and certain melamine-formaldehyde type resins. Generally, the ethylene-urea-formaldehyde resin imparts wrinkle recovery similar to that obtained with the melamine-formaldehyde resins at the same low resin concentration and does not discolor following chlorine bleaching. However, a tensile strength loss, intermediate between the ureau-formaldehyde type resins and melamine-formaldehyde type resins is observed on cellulosic materials treated therewith which are scorched following chlorine bleaching.

It is an object of the present invention to provide resin compositions for treating textile fabrics and in particular cellulosic textile fabrics which impart good wrinkle recovery to the fabric so treated, which eliminates high tensile strength loss following chlorine bleaching, which are durable and which practically eliminate discoloration of the treated fabric following chlorine bleaching.

A further object is to provide a water-soluble resin composition which may be used to impart good wrinkle recovery and dimensional stability of a high order at minimum resin concentrations.

It is a still further object of the present invention to provide such resin compositions and the method of employing the same, whereby, in addition to the features above enumerated, a soft and desirable hand is produced.

Another object is to provide an aminoplast resin composition which is stable in aqueous solution without being alkylated. This is a distinction and advantage over certain unalkylated methylol derivatives of melamine which are not stable in aqueous solution.

These and other objects and advantages are accomplished by treating textile fabric and in particular cellulosic textile fabric or fabric containing cellulosic material, including cotton, viscose rayon and cuprammonium rayon by applying thereto between 1% and about 30% based on the weight of the textile fabric of the reaction product of formaldehyde and a compound having the following general formula:

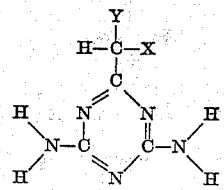

wherein X is selected from the group consisting of alkyl containing 1 to 4 carbon atoms and alkoxy containing not more than 8 carbon atoms and alkoxy alkoxy containing not more than 8 carbon atoms, and wherein when X is alkyl Y is OH and wherein when X is alkoxy or alkoxy alkoxy Y is H, wherein the mole ratio of formaldehyde to guanamine is at least 3:1 and thereafter curing reaction product to a water-insoluble state in the presence of an acid curing catalyst.

Examples of suitable guanamines included within the scope of the present invention are methoxyacetoguanamine; ethoxyacetoguanamine; propoxyacetoguanamine, either normal or iso; butoxyacetoguanamine, either normal, iso or tertiary; amyloxyacetoguanamine; octyloxyacetoguanamine; methoxymethoxyacetoguanamine; butoxymethoxyacetoguanamine, methoxybutoxyacetoguanamine; 4-(ethoxy)-2-ethylbutoxyacetoguanamine; 2-ethylbutoxymethoxyacetoguanamine; α - hydroxypropioguanamine; α-hydroxybutyroguanamine; α-hydroxyvaleroguanamine; 1-hydroxy-2-methylbutyroguanamine; lactoguanamine and the like.

The methylol derivatives or the alkylated methylol derivatives of these guanamines or their equivalents as they are defined in the present invention may be used either singly or in combination.

The guanamines or 2,4-diamino-1,3,5-triazines employed in making the polymethylol derivatives or alkylated polymethylol derivatives of this invention may be prepared by one of a number of conventional ways known to those skilled in the art, as for example, the methods employed in U.S. Patent Nos. 2,491,658, 2,735,850 and others.

These guanamines are then reacted with formaldehyde in an amount sufficient to provide for a combined formaldehyde to guanamine ratio of at least 3:1 in accordance generally with the process set forth subsequently in Example 1. To achieve this, methylolation is carried out by reacting at an alkaline pH from between about 3.5 and 6 moles of formaldehyde (either as formalin, paraformaldehyde or other formaldehyde engendering substances) for each mole of guanamine. Thereafter, the methylol derivative may be alkylated by reacting therewith, on the acid side, a saturated monohydric aliphatic alcohol containing 1 to 4 carbon atoms in accordance with the general process set forth in Example 2. The amount of alcohol required, of course, depends upon the degree of alkylation desired, and the number of moles of combined formaldehyde. Where 3 moles and more of formaldehyde are to be combined, from between 3 and 15 moles of alcohol may be employed.

It is greatly preferred that the polymethylol and alkylated polymethylol compounds of the present invention be fully water soluble or substantially fully water soluble in that they may be used more effectively and with greater facility. As the number of carbon atoms outside the triazine ring structure increases above about sixteen, solubility is decreased. While these compounds possess some solubility and also may be used in dispersions, for the most part it is preferred that the total number of carbon atoms including from 2 to 9 carbon atoms in the 6 substituted position outside the triazine ring be less than 16 and preferably between about 5 and 12. In addition, it is generally preferred that the methylol or alkylated methylol derivatives of the present invention be monomeric in nature, or only partially polymerized in that a high degree of polymerization adversely affects the water solubility of these materials.

The resin composition of the present invention may be applied as aqueous solutions as by spraying, immersion, dipping, padding or the like. Preferably, application baths made up of the resin compositions of the present invention may contain from about 1% to about 30% by weight of solids in dispersion or solution and preferably from about 3 to about 10%.

In applying the resin compositions of the present invention, a suitable acid catalyst is employed to provide the necessary rapid cure of the resin composition. Among the acid and acid-acting type curing catalysts are the ammonium salts like ammonium chloride, amine salts like triethylamine hydrochloride, alkanolamine salts like triethanolamine hydrochloride, metal salts such as magnesium, zinc and aluminum chloride and the like, free acids like oxalic, tartaric and the like. These catalysts may be employed singly or in combination with one another. Catalyst concentrations may vary widely, depending upon the nature of the catalyst itself and the intended use of the resin-treated fabric. The range may be from about ½ to 25% and in certain limited instances, higher, based on the weight of the resin solids employed. More particularly, with ammonium salts such as ammonium sulfate, it may vary from about ½ to about 7.5% based on the weight of resin solids employed; with metal salts, such as preferred anhydrous magnesium chloride, for example, amounts of between 8 and 20% based on the weight of the resin solids is the preferred operating range. With amine or alkanolamine salts, such as isopropanolamine hydrochloride, from about 1 to about 10% catalyst concentration based on the weight of the resin solids employed is preferred.

The preferred method of treating the textile material consists of padding the material to be treated by immersion of the fibrous material in a suitable pad bath followed by passing the wet material through squeeze rolls adjusted to control the amounts of the pad bath liquor picked up by the fibrous material. Thereafter, the treated or impregnated textile fabric is dried and cured.

The drying and curing may be accomplished in separate steps or in one operation if this is preferred. When drying is carried out as a separate step, it may be done at temperatures ranging from about 200° F. to 250° F. for from about 3 minutes to about 1½ minutes, respectively. These times and temperatures have been found to be eminently satisfactory, in particular for light to medium weight cellulosic fabrics. Heavier fabrics may require more time. Generally speaking, the length of time required is inversely proportional to the temperature at which drying is effected. Thus, somewhat longer periods of time would be required when lower temperatures were employed, as, for example, 100° F. and somewhat shorter periods of time would be required for higher temperatures as, for example, 275° F. Thereafter, curing of the resin on the treated fabric is carried out. Again the time required for the cure is inversely proportional to the temperature. The most preferred temperature and time ranges for curing of dried fabrics are from about 4 minutes at about 275° F. to about 30 seconds at 450° F. When drying and curing are carried out in a single-step operation, times of from between about 15 minutes at about 250° F. to about 3 minutes at about 350° F. have been found to be eminently satisfactory.

In order that the present invention may be more fully understood, the following examples are given primarily by way of illustration. No details therein should be construed as limitations except as appear in the appended claims. All parts and percentages are by weight unless otherwise indicated.

EXAMPLE 1

Into a suitable reaction vessel equipped with mechanical stirrer, heating mantle, thermometer and reflux condenser was charged 1215 parts of formalin (15 moles of 37% formaldehyde) which was adjusted to a pH of 8.8 with 3 parts of triethylamine. Thereafter, 591 parts (3 moles) of 6-tertiary-butoxyacetoguanamine was charged at 32 to 35° C. to the reaction vessel within a five-minute period and with continuous stirring. The mixture was heated to 80° C. within 30 minutes and solution was accomplished after 15 minutes at this temperature. The solution was stirred for 1 hour at 80° C. during which time the pH dropped from 8.8 to 8.2. The temperature was then raised rapidly (within 5 minutes) to reflux (100–101° C.) at which temperature the solution was held for 15 minutes. The solution was then cooled rapidly to room temperature and the pH was 7.3. The resulting resin solution had a solids concentration of 52.5% and a combined ratio of formaldehyde to triazine of 3.58 to 1. The polymethylol derivatives of the other guanamines contemplated by the present invention may be prepared by a similar procedure employing proper mole proportions as will be evident to those skilled in the art.

EXAMPLE 2

Into a suitable reaction vessel equipped with mechanical stirrer, heating mantle, thermometer and reflux condenser was charged 212 parts of paraformaldehyde, 35 parts of formalin (7.5 total moles of formaldehyde) and 224 parts of methanol. The pH was adjusted to 10.5 by the addition of a 20% sodium hydroxide solution and the mixture was heated to between 60 and 65° C. until the paraformaldehyde dissolved. 295.5 parts (1.5 moles) of 6-tertiary-butoxyacetoguanamine was added to the reaction vessel and the mixture was heated to reflux in 10 to 15 minutes and held at this temperature (79–85° C.) for about 20 minutes. The pH was 8.5 and the reaction mixture was cooled to 72° C. 256 parts of methanol (making a total of 15 moles added) were added to the reaction mixture and 1.6 parts of oxalic acid dihydrate were then added to adjust the pH to 6.2. The reaction was again brought to reflux (about 75° C.) in 10 minutes and held at this temperature for an additional 25-minute period. The reaction was then cooled to 50 to 55° C. and the pH adjusted to 9.8 with 6.1 parts of 20% sodium hydroxide. The resulting reaction product was concentrated under vacuum at 50 to 55° C. until a Gardner-Holdt viscosity of between X and Y at 25° C. was obtained. The resulting product had a pH of 8.5, a solids content of 71.3%, a combined formaldehyde to triazine ratio of 3.00:1 (75% methylolated) and was completely methylated.

The polymethylol substituted guanamines suitable for forming the resin compositions of the present invention may be alkylated according to the process set forth hereinabove with such variations and modifications as the reactants admit, which will readily suggest themselves to those skilled in the art.

In the following examples, the guanamine resins recited therein are applied by wetting the fabric recited therein in a suitable pad bath followed by squeezing the fabric in a microset padder, set at 20 lbs. per square inch. This treatment results in a wet pick-up of 85%. Thereafter, the treated fabric was dried for 2 minutes at 225° F. and then cured for 1.5 minutes at 350° F. unless indicated otherwise.

Portions of the treated fabric were subjected to Laundromat washes with Chlorox for from 1 to 25 times, as will appear in the tables set forth hereinbelow. These washes comprise a 15-minute wash cycle employing 0.07% neutral soap, 0.02% available chlorine, and a 7:1 liquor to cloth ratio at a temperature of 140° F. Thereafter, three water rinses at 140° F. and at the same liquor to cloth ratio are employed and the fabric so laundered is tumble-dried at 200° F.

As will become apparent in the tables hereinbelow, portions of treated and untreated cloth, washed for various numbers of time and unwashed were subjected to various physical tests recorded in said tables. These include reflectance on a spectrophotometer against a magnesium carbonate standard at 450 m$\mu$ for color. In addition, they were tested for grab tensile strength, on a Scott tester, and wrinkle recovery on a Monsanto crease-angle tester. All of these are standard tests in the textile industry and are described in the Technical Manual and Year Book of the American Association of Textile Chemists and Colorists for 1955. In addition, tensile strength tests were also run on unwashed and washed fabrics after scorching for 30 seconds between metal plates heated to 365° F. The test specimens were conditioned for four hours at 65% relative humidity and 70° F. both before and after scorching. The percentage strength loss due to scorching was then calculated from the unwashed and washed scorch strength values.

Various examples of applications of the compositions of the present invention are shown in Examples 3 to 8 and comparable examples of commercial finishes are given in Examples 9, 10, 11 and 12, respectively. In Examples 3 to 11, the amount of resin solids on the fabric is 3.5% with 12% of anhydrous magnesium chloride as catalyst based on the weight of resin solids. The results of the various physical tests run on the treated fabric as well as the untreated control are summarized in Table I.

EXAMPLE 3

80″ x 80″ cotton percale was immersed in a pad bath containing 8.15 parts of polymethylol 6-tertiary-butoxyacetoguanamine (50.6% solids) having a formaldehyde to triazine ratio equal to 3.52 to 1, and 0.495 part of anhydrous magnesium chloride and an amount of water sufficient to make up 100 parts. A microset padder, set at 20 lbs. per square inch, was then employed to squeeze off excess liquor to produce a wet pick-up of 85%. The treated fabric was then dried for 2 minutes at 225° F. and cured for 1.5 minutes at 350° F.

EXAMPLE 4

80″ x 80″ cotton percale was treated in the manner described in Example 3, except with the following composition:

(a) 5.75 parts of fully methylated polymethylol 6-tertiary-butoxyacetoguanamine containing 71.3% solids and having a formaldehyde to triazine ratio equal to 3.00:1.
(b) 0.495 part of anhydrous magnesium chloride.
(c) Sufficient water to total 100 parts.

EXAMPLE 5

80″ x 80″ cotton percale was treated in the manner described in Example 3 with the following composition:

(a) 7.64 parts of polymethylol 6-methoxyacetoguanamine containing 54% solids and having a formaldehyde to triazine ratio of 3.75:1.
(b) 0.495 part of anhydrous magnesium chloride.
(c) Sufficient water to total 100 parts.

EXAMPLE 6

80″ x 80″ cotton percale was treated in the manner described in Example 3 with the following composition:

(a) 7.55 parts of polymethylol lactoguanamine containing 54.5% solids and having a formaldehyde to triazine ratio of 4.2:1.
(b) 0.495 part of anhydrous magnesium chloride.
(c) Sufficient water to total 100 parts.

EXAMPLE 7

80″ x 80″ cotton percale was treated in the manner described in Example 3 with the following composition:

(a) 8.35 parts of polymethylol 6-tertiary-butoxyacetoguanamine containing 49.5% solids and having a formaldehyde to triazine ratio of 2.0:1.
(b) 0.495 part of anhydrous magnesium chloride.
(c) Sufficient water to total 100 parts.

EXAMPLE 8

80″ x 80″ cotton percale was treated in the manner described in Example 3 with the following composition:

(a) 6.87 parts of polymethylol 6-methoxyacetoguanamine containing 60% solids at a formaldehyde to triazine ratio of 1.9:1.
(b) 0.495 part of anhydrous magnesium chloride.
(c) Sufficient water to total 100 parts.

EXAMPLE 9

80″ x 80″ cotton percale was treated in the manner described in Example 3 with the following composition:

(a) 5.15 parts of methylated polymethylol melamine containing 80% solids at a formaldehyde to melamine ratio of 3.0:1 and methylation equal to 67%.
(b) 0.495 part of anhydrous magnesium chloride.
(c) Sufficient water to total 100 parts.

EXAMPLE 10

80″ x 80″ cotton percale was treated in the manner described in Example 3 with the following composition:

(a) 4.85 parts of methylated polymethylol melamine containing 85% solids at a formaldehyde to melamine ratio of 5.0:1 and methylation equal to 50%.
(b) 0.495 part of anhydrous magnesium chloride.
(c) Sufficient water to total 100 parts.

EXAMPLE 11

80″ x 80″ cotton percale was treated in the manner described in Example 3 with the following composition:

(a) 8.24 parts of dimethylol ethylene urea containing 50% solids at a formaldehyde to urea ratio of 1.8:1.
(b) 0.495 part of anhydrous magnesium chloride.
(c) Sufficient water to total 100 parts.

EXAMPLE 12

80″ x 80″ cotton percale was treated in the manner described in Example 3 with the following composition:

(a) 25.2 parts of a 2:1 mixture of monomethylol urea and dimethylol urea, respectively containing 56% solids.
(b) 0.495 part of 100% diammonium hydrogen phosphate.
(c) Sufficient water to total 100 parts.

The amount of resin solids on the fabric was 12% and the amount of catalyst based on the weight of resin solids was 3.5%. In order to obtain initial wrinkle recovery of the order of magnitude of the other resin materials referred to in the examples above, it was necessary to employ 12% of the urea-formaldehyde type resin.

The results of the various physical tests run on the fabric treated according to Examples 3 to 12 are summarized in Table I hereinbelow.

Table I

A

| Treatment | | No. of Washes | 0 | 9 | 25 |
|---|---|---|---|---|---|

Reflectances, percent at 450 mμ

| Example 3 | Cotton, 80″ x 80″ | 85 | 85 | 85 |
|---|---|---|---|---|
| Example 4 | ...do... | 83 | 86 | 86 |
| Example 5 | ...do... | 85 | 87 | 86 |
| Example 6 | ...do... | 84 | 84 | 87 |
| Example 7 | ...do... | 81 | 76 | 69 |
| Example 8 | ...do... | 84 | 78 | 71 |
| Example 9 | ...do... | 83 | 74 | 61 |
| Example 10 | ...do... | 85 | 83 | 71 |
| Example 11 | ...do... | 83 | 88 | 88 |
| Example 12 | ...do... | 85 | 85 | 85 |
| Untreated | ...do... | 85 | 89 | 89 |

B

| Treatment | | No. of Washes | 0 | 6 | 9 | 25 |
|---|---|---|---|---|---|---|

Wrinkle Recovery, Total Deg. Warp and Fill

| Example 3 | Cotton, 80″ x 80″ | 219 | — | 235 | 208 |
|---|---|---|---|---|---|
| Example 4 | ...do... | 219 | — | 219 | 207 |
| Example 5 | ...do... | 239 | — | 233 | 228 |
| Example 6 | ...do... | 239 | — | 228 | 221 |
| Example 7 | ...do... | 187 | [1] 206 | — | — |
| Example 8 | ...do... | 208 | [1] 202 | — | — |
| Example 9 | ...do... | 208 | — | 213 | 206 |
| Example 10 | ...do... | 221 | — | 230 | 218 |
| Example 11 | ...do... | 215 | — | 205 | 198 |
| Example 12 | ...do... | 232 | — | 197 | 165 |
| Untreated | ...do... | 147 | — | 158 | 163 |

[1] No further tests run in that wrinkle recovery already below a commercially acceptable level after 6 washes.

C

| Treatment | | No. of Washes | 0 | 6 | 9 | 25 | Approx. Percent Loss |
|---|---|---|---|---|---|---|---|

Scorched 30 sec. at 365° F. Tensile Strength, Total lb. Warp and Fill

| Example 3 | Cotton, 80″ x 80″ | 59 | (—) | 48 | 53 | 10 |
|---|---|---|---|---|---|---|
| Example 4 | ...do... | 63 | (—) | 50 | 57 | 9 |
| Example 5 | ...do... | 54 | (—) | 51 | 50 | 7 |
| Example 7 | ...do... | 71 | [2] 55 | (—) | (—) | (—) |
| Example 8 | ...do... | 74 | [2] 29 | (—) | (—) | (—) |
| Example 9 | ...do... | 59 | (—) | 54 | 55 | 7 |
| Example 10 | ...do... | 56 | (—) | 54 | 56 | 0 |
| Example 11 | ...do... | 52 | (—) | 27 | 21 | 60 |
| Example 12 | ...do... | 53 | [2] 8 | (—) | (—) | 85 |
| Untreated | ...do... | 80 | (—) | 77 | 73 | 8 |

(—) Test not run.
[2] No further tests made as tensile strength loss already too great at 6 wash cycles.

It will be noted from a reading of Section A of Table I that the reflectance readings of polymethylol and alkylated polymethylol derivatives of the substituted guanamines of the present invention which are at least 75% methylolated are essentially unchanged after 25 washings. In addition, they are superior to guanamines of their class which are less than 75% methylolated, and methylated methylol melamines.

Section B of Table I reveals that the guanamines of the present invention that are at least 75% methylolated have a wrinkle recovery equivalent or slightly better than the methylated methylol melamines and are superior to the methylol ethylene urea type resin, guanamines of the type employed in the present invention which are less than 75% methylolated, and urea-formaldehyde resins.

Section C of Table I reveals that the tensile strength loss of fabric treated with the resins of the present invention is significantly less than resins of their class which are not at least about 75% methylolated, methylol ethylene ureas and urea formaldehydes and are comparable to the methylated methylol melamine type resin.

EXAMPLE 13

Same as Example 3, except 0.74 part of anhydrous magnesium chloride was employed instead of that stated in Example 3. The amount of resin on the fabric was 3.5% solids with 18% magnesium chloride based on the weight of the resin solids. (50% more MgCl₂ based on the weight of resin than in Example 3.)

EXAMPLE 14

Same as Example 9, except for the magnesium chloride content and resin concentration which were the same as in Example 13.

EXAMPLE 15

Same as Example 10, except for the magnesium chloride content and resin concentration which were the same as in Example 13.

EXAMPLE 16

Same as Example 11, except for the magnesium chloride content and resin concentration which were the same as in Example 13.

The results of physical tests on cloth treated with the compositions of Examples 13, 14, 15 and 16 are shown in Table II. The concentration of Chlorox employed in the Laundromat washes was five times that described in the wash procedure described hereinabove, i.e. the wash water contains approximately .10% available chlorine. By so increasing the amount of available chlorine, the results of the various tests are greatly accelerated. Thus, fabric having a wrinkle recovery of 176 after 16 washes under these accelerated conditions would probably have a wrinkle recovery under normal conditions of better than 200 after 20 washes.

Table II

| Treatment | | No. of Washes | 0 | 1 | 4 | 16 |
|---|---|---|---|---|---|---|

Wrinkle Recovery, Total Degrees Warp and Fill

| Example 13 | Cotton, 80″ x 80″ | 232 | 222 | 232 | 176 |
|---|---|---|---|---|---|
| Example 14 | ...do... | 212 | 238 | 234 | (X) |
| Example 15 | ...do... | 236 | 221 | 214 | (X) |
| Example 16 | ...do... | 215 | 160 | (X) | (X) |
| Untreated | ...do... | 146 | 143 | 151 | 126 |

Tensile Strength, Total lb. Warp and Fill

| Example 13 | Cotton, 80″ x 80″ | 65 | 63 | 58 | 23 |
|---|---|---|---|---|---|
| Example 14 | ...do... | 76 | 69 | 61 | (X) |
| Example 15 | ...do... | 72 | 66 | 63 | (X) |
| Example 16 | ...do... | 60 | 21 | (X) | (X) |
| Untreated | ...do... | 98 | 88 | 84 | 21 |

Resin Retention, Percent (based on nitrogen analyses)

| Example 13 | Cotton, 80″ x 80″ | (—) | 100 | 96 | 60 |
|---|---|---|---|---|---|
| Example 14 | ...do... | (—) | 100 | 92 | (—) |
| Example 15 | ...do... | (—) | 98 | 97 | 60 |
| Example 16 | ...do... | (—) | 42 | (—) | (—) |

Code: (—) Test not run. (X) Cloth too weak to run tests.

Table II illustrates that the resins of the present invention when applied as in Example 13 impart higher and more durable wrinkle recovery and result in superior tensile strength of the fabric treated therewith. In addition, they are more durable, as is evidenced by the percent of resin retention on the fabric, than the methylated methylol melamine, the methylol ethylene urea, and equally as good as the second methylated methylol melamine which is more fully methylolated and methylated than the first.

As noted above, the principal use of the resinous composition of the present invention is in the treatment of cellulosic textile materials. As will be noted in Examples 7 and 8 above and the results recorded therefor in Table I, it is of the utmost importance that the polymethylol derivatives of the guanamines of the present invention have a combined formaldehyde to triazine ratio of at least about 3.00:1 to be effective against discoloration due principally to the deleterious effects produced by chlorine retention. It has been noted, however, that in the treatment of rayon, in particular viscose rayon, that a combined formaldehyde to triazine ratio of 2:1 gives unusual and unexpected tear strength properties. The reason for this, while not fully understood, is surprising and since a viscose rayon fabric is not likely to be chlorine bleached in a washing cycle because the poor resistance of this type fabric to chlorine caused damage, guanamines of the present invention having a combined formaldehyde to triazine ratio of this lower order may be employed on rayon fabric satisfactorily.

The amount of resin solids employed on fabric and the amount of acid catalyst used to effect their cure may vary over wide proportions within the limits set forth hereinabove depending upon the desired end properties to be produced in the fabric. Such variations, for the most part, are well known to those skilled in the art. Thus, for example, where the wrinkle recovery of a given fabric is of paramount importance, larger amounts of resin may be employed, but this generally results in a greater loss in tensile strength of the treated fabric. One skilled in the art may make such adjustments in relative amounts of resin and catalyst, conditions of cure, and the like, to achieve suitable desired end results.

I claim:

1. A process for treating cellulosic textile material comprising applying thereto in amounts of between 1% and about 30% by weight of solids based on the weight of the textile material of a reaction product of formaldehyde and a guanamine having the following general formula:

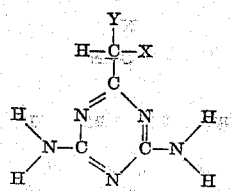

wherein X is selected from the group consisting of alkyl containing 1 to 4 carbon atoms, alkoxy containing not more than 8 carbon atoms, and alkoxy alkoxy containing not more than 8 carbon atoms, wherein when X is alkyl Y is OH, and wherein when X is alkoxy and alkoxy alkoxy Y is H, and wherein the mole ratio of formaldehyde to guanamine is at least 3:1, and thereafter curing said resin to a water-insoluble state in the presence of an acid curing catalyst.

2. The process according to claim 1 wherein the guanamine-formaldehyde reaction product has been alkylated with a saturated aliphatic alcohol containing from 1 to 4 carbon atoms.

3. A process for treating cellulosic textile material comprising applying thereto in an amount of between 3% and 10% by weight of solids based on the weight of the textile material of a water-soluble reaction product of formaldehyde and a guanamine having the following general formula:

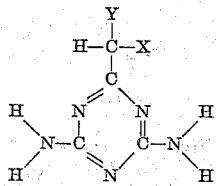

wherein X is selected from the group consisting of alkyl containing 1 to 4 carbon atoms, alkoxy containing not more than 8 carbon atoms, and alkoxy alkoxy containing not more than 8 carbon atoms, and wherein when X is alkyl Y is OH, and wherein when X is alkoxy and alkoxy alkoxy Y is H, and wherein the mole ratio of formaldehyde to guanamine is at least 3:1, and thereafter curing said resin to a water-insoluble state in the presence of from between ½ and 25% of an acid curing catalyst based on the weight of the resin solids.

4. The process according to claim 3 wherein the guanamine-formaldehyde reaction product has been alkylated with a saturated aliphatic alcohol containing from 1 to 4 carbon atoms.

5. The process according to claim 4 wherein the alcohol is methanol.

6. The process according to claim 4 wherein the alcohol is ethanol.

7. The process according to claim 4 wherein the alcohol is propyl.

8. The process according to claim 4 wherein the alcohol is butyl.

9. A process for treating cellulosic textile material comprising applying thereto in an amount of between 3% and 10% by weight of solids, based on the weight of textile material of a water-soluble reaction product of formaldehyde and a guanamine having the following general formula:

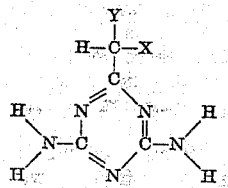

wherein X is selected from the group consisting of alkyl containing 1 to 4 carbon atoms and alkoxy containing not more than 8 carbon atoms, and alkoxy alkoxy containing not more than 8 carbon atoms, wherein when X is alkyl Y is OH, and wherein when X is alkoxy and alkoxy alkoxy Y is H, and wherein the mole ratio of formaldehyde to guanamine is at least 3:1, and thereafter curing said resin in the presence of an acid catalyst to a water-insoluble state at a temperature from 275° F. to 450° F.

10. A process for treating cellulosic textile material comprising applying thereto in an amount of between 3% and 10% by weight of solids, based on the weight of textile material of a water-soluble reaction product of formaldehyde and a guanamine having the following general formula:

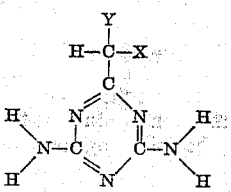

wherein X is selected from the group consisting of alkyl containing from 1 to 4 carbon atoms, alkoxy containing not more than 8 carbon atoms and alkoxy alkoxy containing not more than 8 carbon atoms, wherein when X is alkyl Y is OH, and wherein when X is alkoxy and alkoxy alkoxy Y is H, and wherein the mole ratio of formaldehyde to guanamine is at least 3:1, and thereafter curing said resin in the presence of from 8 to 20% based on the weight of the resin solids of anhydrous magnesium chloride, to a water-insoluble state at a temperature of from between 275° F. to 450° F.

11. A process for treating cellulosic textile material comprising applying thereto from between 3% and 10% by weight of solids, based on the weight of textile material of a water-soluble reaction product of formaldehyde and a guanamine having the following formula:

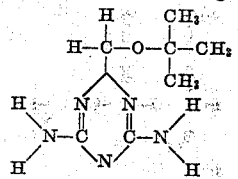

wherein the mole ratio of formaldehyde to guanamine is at least 3:1, and thereafter curing said compound in the presence of from 8 to 20% based on the weight of the resin solids of anhydrous magnesium chloride, to a water-insoluble state at a temperature of from between 275° F. and 450° F.

12. A process for treating cellulosic textile material comprising applying thereto from between 3% and 10% by weight of solids, based on the weight of textile material of a water-soluble reaction product of formaldehyde and a guanamine having the formula:

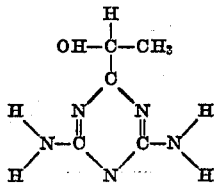

wherein the mole ratio of formaldehyde to guanamine is at least 3:1, and thereafter curing said resin to a water-insoluble state in the presence of from 8 to 20% based on the weight of the resin solids of anhydrous magnesium chloride, and at a temperature of from between 275° F. and 450° F.

13. A process for treating cellulosic textile material comprising applying thereto from between 3% and 10% by weight of solids, based on the weight of textile material of a water-soluble reaction product of formaldehyde and a guanamine having the following formula:

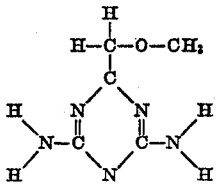

wherein the mole ratio of formaldehyde to guanamine is at least 3:1, and thereafter curing said resin to a water-insoluble state in the presence of from 8 to 20% based on the weight of the resin solids of anhydrous magnesium chloride, at a temperature of from between 275° F. and 450° F.

14. A process for treating cellulosic textile material comprising applying thereto from between 3% and 10% by weight of solids, based on the weight of textile material of a water-soluble reaction product of formaldehyde and a guanamine having the following formula:

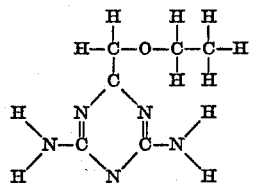

wherein the mole ratio of formaldehyde to guanamine is at least 3:1, and thereafter curing said resin to a water-insoluble state in the presence of from 8 to 20% based on the weight of the resin solids of anhydrous magnesium chloride, at a temperature of from between 275° F. and 450° F.

15. A process for treating cellulosic textile material comprising applying thereto from between 3% and 10% by weight of solids, based on the weight of textile material of a water-soluble reaction product of formaldehyde and a guanamine having the following formula:

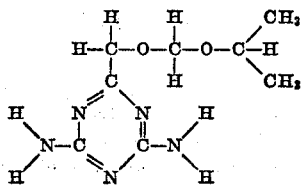

wherein the mole ratio of formaldehyde to guanamine is at least 3:1, and thereafter curing said resin to a water-insoluble state in the presence of from 8 to 20% based on the weight of the resin solids of anhydrous magnesium chloride, at a temperature of from between 275° F. and 450° F.

16. A cellulosic textile material containing from 1 to 30% of a cured reaction product of formaldehyde and a guanamine having the following general formula:

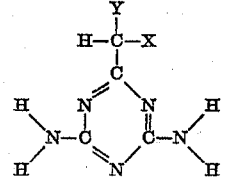

wherein X is selected from the group consisting of alkyl containing 1 to 4 carbon atoms, and alkoxy containing not more than 8 carbon atoms, and alkoxy alkoxy containing not more than 8 carbon atoms, wherein when X is alkyl Y is OH and wherein when X is alkoxy and alkoxy alkoxy Y is H, and wherein the mole ratio of formaldehyde to guanamine is at least 3:1.

17. A cellulosic textile material containing from 1 to 30% of a cured reaction product of formaldehyde and a guanamine having the following formula:

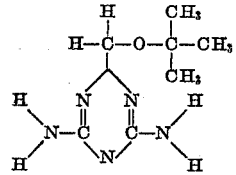

wherein the mole ratio of formaldehyde to guanamine is at least 3:1.

18. A cellulosic textile material containing from 1 to 30% of a cured reaction product of formaldehyde and a guanamine having the following formula:

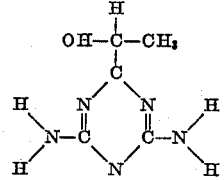

wherein the mole ratio of formaldehyde to guanamine is at least 3:1.

19. A cellulosic textile material containing from 1 to 30% of a cured reaction product of formaldehyde and a guanamine having the following formula:

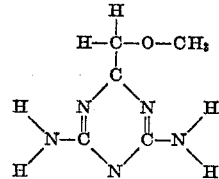

wherein the mole ratio of formaldehyde to guanamine is at least 3:1.

20. A cellulosic textile material containing from 1 to 30% of a cured reaction product of formaldehyde and a guanamine having the following formula:

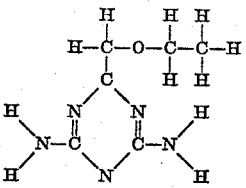

wherein the mole ratio of formaldehyde to guanamine is at least 3:1.

21. A cellulosic textile material containing from 1 to 30% of a cured reaction product of formaldehyde and a guanamine having the following formula:
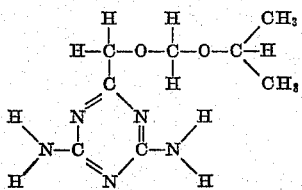
wherein the mole ratio of formaldehyde to guanamine is at least 3:1.
References Cited in the file of this patent
UNITED STATES PATENTS
| | | |
|---|---|---|
| 2,310,004 | Widmer et al. | Feb. 2, 1943 |
| 2,385,766 | Thurston | Sept. 25, 1945 |
| 2,387,547 | Widmer et al. | Oct. 23, 1945 |
| 2,461,943 | Thurston | Feb. 15, 1949 |
| 2,635,083 | Cordier | Apr. 14, 1953 |
| 2,777,848 | Schaefer | Jan. 15, 1957 |

UNITED STATES PATENT OFFICE
CERTIFICATE OF CORRECTION

May 19, 1959

Patent No. 2,887,409

William Julius van Loo, Jr.

It is hereby certified that error appears in the above numbered patent requiring correction and that the said Letters Patent should read as corrected below.

In the grant, lines 1 to 3, for "William Julius van Loo, Jr., of Middlesex, New Jersey," read -- William Julius van Loo, Jr., of Middlesex, New Jersey, assignor to American Cyanamid Company, of New York, N. Y., a corporation of Maine, --; line 12, for "William Julius van Loo, Jr., his heirs" read -- American Cyanamid Company, its successors --; in the heading to the printed specification, line 5, for "William Julius van Loo, Jr., Middlesex, N. J." read -- William Julius van Loo, Jr., Middlesex, N. J., assignor to American Cyanamid Company, New York, N. Y., a corporation of Maine --; column 1, line 57, for "ureau-formaldehyde" read -- urea-formaldehyde --; column 3, line 12, for "including from" read -- including the from --.

Signed and sealed this 10th day of November 1959.

(SEAL)
Attest:
KARL H. AXLINE

Attesting Officer

ROBERT C. WATSON
Commissioner of Patents